United States Patent
Liu et al.

(10) Patent No.: US 10,482,576 B2
(45) Date of Patent: Nov. 19, 2019

(54) SYSTEMS AND METHODS FOR MULTI-SPECTRAL IMAGE SUPER-RESOLUTION

(71) Applicant: Mitsubishi Electric Research Laboratories, Inc., Cambridge, MA (US)

(72) Inventors: Dehong Liu, Lexington, MA (US); Bihan Wen, Urbana, IL (US); Ulugbek Kamilov, Cambridge, MA (US); Hassan Mansour, Boston, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 54 days.

(21) Appl. No.: 15/924,559

(22) Filed: Mar. 19, 2018

(65) Prior Publication Data
US 2019/0287216 A1    Sep. 19, 2019

(51) Int. Cl.
*G06K 9/00* (2006.01)
*G06T 3/40* (2006.01)

(52) U.S. Cl.
CPC .. *G06T 3/4061* (2013.01); *G06T 2207/10036* (2013.01); *G06T 2207/20081* (2013.01)

(58) Field of Classification Search
CPC ...... G06K 9/6215; G06K 9/60; G06T 3/4061; G06T 3/4053; G06T 3/4007;
(Continued)

(56) References Cited

U.S. PATENT DOCUMENTS 6,529,074 B1   3/2003  Melanson et al.
7,055,869 B2   6/2006  Malone
(Continued)

OTHER PUBLICATIONS

Chen et al., "Deep Learning with Hierarchical Convolutional Factor Analysis," IEEE Transactions on Pattern Analysis and Machine Intelligence, vol. 35, No. 8, Aug. 2013. pp. 1887-1901.
(Continued)

*Primary Examiner* — Amir Alavi
(74) *Attorney, Agent, or Firm* — Gennadiy Vinokur; James McAleenan; Hironori Tsukamoto

(57) ABSTRACT

Systems and methods for image processing for increasing resolution of a multi-spectral image. Accept a multi-spectral image including a set of images of a scene. A memory to store a set of dictionaries trained for different channels, and a set of filters trained for the different channels. A hardware processor is to process the set of images of the different channels with the set of filters, and to fuse, for each channel, the set of structures, to produce a set of fused structures. Wherein a fused structure of the channel is fused as a weighted combination of the set of structures using weights corresponding to the channel, such that the fused structures of different channels are combined with different weights. To process the set of fused structures with corresponding dictionaries from the set of dictionaries, to produce a super-resolution multi-spectral image. An output interface to render the super-resolution multi-spectral image.

18 Claims, 11 Drawing Sheets

(58) Field of Classification Search
CPC .... G06T 3/4015; H04N 9/69; H04N 5/23232; H04N 5/2258; H04N 5/349; H04N 5/2621; H04N 5/001; H04N 5/50
See application file for complete search history.

(56) References Cited

U.S. PATENT DOCUMENTS

| | | | |
|---|---|---|---|
| 7,312,977 | B2 | 12/2007 | Yamada et al. |
| 7,684,643 | B2 * | 3/2010 | Chen .................. G06T 5/50 341/107 |
| 8,185,357 | B1 * | 5/2012 | Szu .................. G06T 7/0012 702/134 |
| 9,225,889 | B1 * | 12/2015 | Korkin ................ H04N 5/2258 |
| 9,251,565 | B2 * | 2/2016 | Phan .................. G06T 3/4053 |
| 9,336,570 | B2 * | 5/2016 | Kanaev ................ G06T 3/4015 |
| 9,563,817 | B2 * | 2/2017 | Holt .................. G06T 5/50 |
| 9,792,668 | B2 * | 10/2017 | Korkin ................ H04N 5/2258 |
| 2012/0300064 | A1 * | 11/2012 | Mann .................. G01C 11/025 348/135 |
| 2018/0130217 | A1 * | 5/2018 | Ray .................. G06T 7/337 |

OTHER PUBLICATIONS

Degraux et al., "Online Convolutional Dictionary Learning for Multimodal Imaging," IEEE International Conference on Image Processing, IEEE Sep. 17, 2017. pp. 1617-1621.
Degraux et al., "Chapter 4, Online Convolutional Dictionary Learning for Multimodal Imaging," In Methods for Solving Regularized Inverse Problems: from Non-Euclidian Fidelities to Computational Imaging Applications—PhD Dissertation. Jan. 1, 2017. pp. 95-117.

* cited by examiner

SYSTEMS AND METHODS FOR MULTI-SPECTRAL IMAGE SUPER-RESOLUTION

FIELD

The present disclosure relates generally to multi-spectral imaging, and more particularly to increasing resolution of multi-spectral images using convolutional dictionaries.

BACKGROUND

Multi-spectral (MS) imaging systems encounter a trade-off between spatial and spectral resolution in the hardware implementation. While high spatial resolution of MS images is desirable for many applications, the resolution of the MS images is typically degraded due to the limitations on the size, weight, and power of the sensors, e.g., sensors mounted on the board of an airplane or spacecraft.

In order to achieve super-resolved images, some conventional image processing techniques aim to improve image resolution and to mitigate this hardware limitation by using multiple successive frames from the same scene that are combined to improve spatial resolution. Some conventional methods use varies techniques to address some of hardware problems. For example, a method described in U.S. Pat. No. 7,015,954, uses multiple cameras to obtain multiple continuous images of the scene, and combines the images via warping and fading techniques, to produce a single seamless image of the scene.

Image super-resolution (SR) is generally an ill-posed inverse problem. In the context of Multi-spectral (MS) imaging, the goal is to reconstruct the high-resolution (HR) multi-channel images from their low resolution (LR) measurements. Pan-sharpening methods have been proposed to fuse the LR MS images with a HR panchromatic (PAN) image as reference. These Pan-sharpening methods can somewhat improve the spatial resolution, only to some extent, by enhancing the high-frequency components in the spatial domain.

The present disclosure addresses the technological needs of today's image processing industries and other related technology industries, by increasing resolution of multi-spectral images using a coupled analysis and synthesis dictionary (CASD) model, along with other aspects.

SUMMARY

The present disclosure relates to increasing resolution of multi-spectral (MS) images using convolutional dictionaries. In particular, Multi-spectral (MS) image super-resolution aims to reconstruct super-resolved (SR) multi-channel images from their low-resolution images by regularizing the image to be reconstructed. Some embodiment of the present disclosure increase resolution of MS images using a coupled analysis and synthesis dictionary (CASD) model that uses a deep dictionary learning framework to exploiting the spatial and spectral relationship across multiple spectral channels. Through the present disclosure the term analysis dictionary can also be referred to as a filter dictionary.

The present disclosure through experimentation, has develop a novel Coupled Analysis and Synthesis Dictionary (CASD) model for MS image SR, by exploiting a regularizer that operates within, as well as across multiple spectral channels using convolutional dictionaries. For example, the CASD model includes parameters, where a deep dictionary learning framework, named DeepCASD, can be used by unfolding and training an end-to-end CASD based reconstruction network over an image dataset.

To better understand the present disclosure and some of the realizations learned through experimentation, it is important to understand some of the challenges that needed to be overcome. For example, while high spatial resolution of MS images is desirable for many applications, MS image resolution is typically low due to the limitations on the size, weight, and power of the sensors mounted on the board of an airplane, spacecraft or some other sensor mounted application. MS image super-resolution (SR) aims to reconstruct super-resolved multi-channel images from their low-resolution images by regularizing the image to be reconstructed.

Some embodiments are based on recognition that the introduction of dictionary learning makes data-driven methods advantageous for image super resolution. Learned through experimentation is that MS images can be processed independently for each spectral channel A naive way to extend these convolutional dictionary learning methods to MS image SR applications can be by learning convolutional dictionaries independently from channel to channel. However, some embodiments are based on the recognition that this extension would not exploit the relationship of multi-spectral images across the spectral channels.

Aspects learned through experimentation includes that MS imaging systems can measure the response from an area of interest over a wide range of frequency bands including visible optical RGB, infra-red, and short-wave infra-red bands. These multi-band spectra can provide rich information for detecting and distinguishing materials, especially for those materials with visually similar colors. Furthermore, the higher atmospheric transmission property of infra-red bands versus optical bands makes the MS imaging more beneficial in hazy or cloudy weather conditions when optical imaging systems do not work well. Some approaches tested during experimentation included multispectral and hyperspectral imaging techniques, i.e. image super-resolution (SR), which is generally an ill-posed inverse problem. At least one approach tested to solve this problem, included using regularizers on the underlying high-resolution image. Other tested approaches included pan-sharpening techniques, for example, where the spatial information of known panchromatic images were fused with the spectral information of color or MS images, to generate high spatial resolution and high spectral resolution images. However, learned from this experimentation was that because the spectral band of panchromatic images does not overlap with infrared bands, pan-sharpening methods can introduce spectral distortion for MS image SR, especially the infrared bands, yielding poor performance in the MS image super-resolution process.

In order to fully exploit the relationship of MS image within as well as across different image channels, some embodiments introduce a data-driven Coupled Analysis and Synthesis Dictionary (CASD) model that relates the multi-channel low resolution (LR) measurements with the high resolution (HR) images through shared feature maps and coupled convolutional dictionaries. To learn the CASD model, the present disclosure uses a deep-learning framework, named DeepCASD, which leverages training data more effectively with end-to-end training, wherein the MS image SR process uses DeepCASD. Through experimentation, several advantages, among many and by non-limiting examples include allowing for couplings within and across multiple channels with a shared feature map, an end-to-end learning framework for image SR, and providing greater flexibility in terms of the total number of spectral channels and image resolution compared to traditional pan-sharpening and single-channel image SR processes.

Also learned through experimentation is that the CASD model allows to exploit the correlation between the low-resolution MS images and the high-resolution MS images to be reconstructed. In particular, the analysis convolutional dictionary $B_l$ (l=1, . . . , L) is composed of M×L convolutional dictionaries (filters) $\{W_{mi}\}$, where the ith (i=1, . . . , L) column includes a set of M filters to be convolved with the low-resolution image of the ith channel. The summation of filtered low-resolution images represents the lth channel feature map or structure. If all entries of $B_l$ equal zero except those in the lth column for all channels l=1, . . . , L, this particular convolutionary dictionary is equivalent to learning convolutional dictionary for each spectral channel independently. However, other non-zero values of the convolutional dictionary $B_l$ can capture intra-channel dependency of MS images.

Specifically, some embodiments are based on recognition that a high-resolution image for each channel can be represented as a convolution of a dictionary learned for high-resolution images of a channel and a structure of a low-resolution image of the channel That structure can be extracted from each low-resolution image independently for each channel. However, this approach would not exploit the relationship of multi-spectral images across spectral channels. To that end, some embodiments are based on realization that the structure of the low-resolution image of a scene acquired in a frequency band of the channel can be learned from different low-resolution images of the scene acquired in different frequency bands of different channels including the frequency band of the channel Specifically, the structure of the low-resolution image is a combination of filtered low-resolution images of different channels. Furthermore, the structure map is sparse in the image domain under threshold θ, i.e., most of the structure map coefficients are zeros. The coefficients of the filters $B_l$, dictionaries of the high-resolution images D, as well as the threshold θ can be learned off-line for each channel Different coefficients of the filters correspond to different channels. Moreover, at least some coefficients of the filters representing different channels are non-zero to enable intra-channel dependency of MS images. In such a manner, the inter-image relationships are encoded in the dictionary, and intra-channel relationships are encoded in the filters.

To learn and apply the CASD model for MS image super-resolution, some embodiments use a neural network, such as a deep fusion network, and an end-to-end training method of the deep fusion network. Instead of iteratively updating model parameters, where each parameter is updated given the latest updates of other parameters, some embodiments unfold the CASD learning process for image fusion to construct a multi-layer neural network. The whole network is trained end-to-end using error back propagation, where each parameter is not just related to the latest updates of other parameters, but also related to the history updates of parameters.

For example, given a signal s and a dictionary matrix D, sparse coding is the inverse problem of finding the sparse representation x with only a few non-zero entries such that $Dx \approx s$. The process of arriving at these identifications requires a technique for learning the dictionary matrix D, referred herein as dictionary learning or a convolutional dictionary learning when the matrix D is learned for the entire image. Further, learning the dictionary matrix using the sparse representation may be beneficial for some applications. However, when the dictionary matrix D is learned for the high-resolution image that dictionary matrix can increase the resolution of the image using sparse representation x of the low-resolution image.

Some embodiments, in order to extent this concept to MS image super-resolution, learn the structure of an image of one channel from structures of different images of the multi-spectral image. For example, some embodiments fused the structures of different images for each channel using different weights to produce a set of fused structures. In such a manner, a fused structure of the channel is fused as a weighted combination of the set of structures using weights corresponding to the channel Notably, the fused structures of different channels are combined with different weights.

In some implementations, the set of dictionaries, the set of filters, and a set of weights for fusing structures of each channel are jointly trained using different images of different channels. For example, some embodiments introduce filters $B_l = \{W_{mi}\}$, capturing the structural relationship among MS images. In addition, some embodiments determine dictionary matrix D, coefficients of the filters $B_l = \{W_{mi}\}$, and threshold θ by minimizing the negative average peak signal-to-noise ratio over all training images and channels. In such a manner, the coefficients of the filter are trained to produce the sparse representation of MS image under trained threshold θ. The sparse representation, when convolved with the trained dictionary matrix, produces high-resolution MS image.

According to another embodiment of the present disclosure, an imaging system for increasing resolution of a multi-spectral image. The system including an input interface to accept a multi-spectral image including a set of images of a scene generated by sensors. Wherein each image represents a channel defining a frequency band, such that an image of a channel has its frequencies within a frequency band of the channel. A memory to store a set of synthesis dictionaries trained for different channels. Such that a synthesis dictionary trained for a channel convolved with a structure of the image, produces a high-resolution image of the channel having a resolution greater than a resolution of the image of the channel. The memory to store a set of filters (analysis dictionaries) trained for the different channels. Such that a filter (analysis dictionary) trained for a channel convolved with each image in the set of images produces the structure of the image of the channel A hardware processor is to process the set of images of the different channels with the set of filters (analysis dictionaries) to produce a set of structures. The processor is to fuse, for each channel, the set of structures, to produce a set of fused structures. Wherein a fused structure of the channel is fused as a weighted combination of the set of structures using weights corresponding to the channel, such that the fused structures of different channels are combined with different weights. The processor is to process the set of fused structures with corresponding dictionaries from the set of dictionaries, to produce a super-resolution multi-spectral image. An output interface to render the super-resolution multi-spectral image.

According to an embodiment of the present disclosure, a method for image processing for increasing resolution of a multi-spectral image. The method including acquiring a multi-spectral image including a set of images of a scene generated by sensors and either acquired by an input interface or from a computer readable memory. Wherein each image represents a channel defining a frequency band, such that an image of a channel has its frequencies within a frequency band of the channel Storing in a database of the computer readable memory, a set of dictionaries trained for different channels. Such that a dictionary trained for a channel convolved with a structure of the image, produces a high-resolution image of the channel having a resolution greater than a resolution of the image of the channel Storing in another database of the computer readable memory, a set of filters trained for the different channels. Such that a filter trained for a channel convolved with each image in the set of images, produces the structure of the image of the channel. Processing the set of images of the different channels with the stored set of filters to produce a set of structures using a hardware processor in communication with the computer readable memory and the input interface. Using the hardware processor to fuse, for each channel, the set of structures to produce a set of fused structures. Wherein a fused structure of the channel is fused as a weighted combination of the set of structures using weights corresponding to the channel, such that the fused structures of the different channels are combined with different weights. Processing the set of fused structures with corresponding dictionaries from the set of dictionaries, to produce a super-resolution multi-spectral image of the scene. Outputting the super-resolution multi-spectral image by an output interface to a communication network, or storing the super-resolution multi-spectral image in the computer readable memory.

According to another embodiment of the present disclosure, a non-transitory computer readable storage medium embodied thereon a program executable by a computer for performing a method. The method for image processing of images of a scene. The method is for image processing of images of a scene, including acquiring a multi-spectral image including a set of images of a scene generated by sensors and either acquired by an input interface or from the storage medium. Wherein each image represents a channel defining a frequency band, such that an image of a channel has its frequencies within a frequency band of the channel Storing in a database of the storage medium, a set of dictionaries trained for different channels. Such that a dictionary trained for a channel convolved with a structure of the image, produces a high-resolution image of the channel having a resolution greater than a resolution of the image of the channel Storing in another database of the storage medium, a set of filters trained for the different channels. Such that a filter trained for a channel convolved with each image in the set of images, produces the structure of the image of the channel Processing the set of images of the different channels with the stored set of filters to produce a set of structures using the computer in communication with the storage medium and the input interface. Using the computer to fuse, for each channel, the set of structures to produce a set of fused structures. Wherein a fused structure of the channel is fused as a weighted combination of the set of structures using weights corresponding to the channel, such that the fused structures of the different channels are combined with different weights. Processing the set of fused structures with corresponding dictionaries from the set of dictionaries, to produce a super-resolution multi-spectral image of the scene. Outputting the super-resolution multi-spectral image by an output interface to a communication network, or storing the super-resolution multi-spectral image in the storage medium.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B, FIG. 2C, FIG. 2D and FIG. 2E are pictures illustrating example images from the training stage, wherein FIG. 2B illustrates low resolution images, FIG. 2C illustrates multispectral images 211 as the output of the shrinkage field networks, and as the input of the CASD model, FIG. 2D illustrates output images from the CASD model, and FIG. 2E illustrates stored corresponding high resolution images that are compared to the output images of FIG. 2D during the training/learning period, according to embodiments of the present disclosure;

Figure 1A:
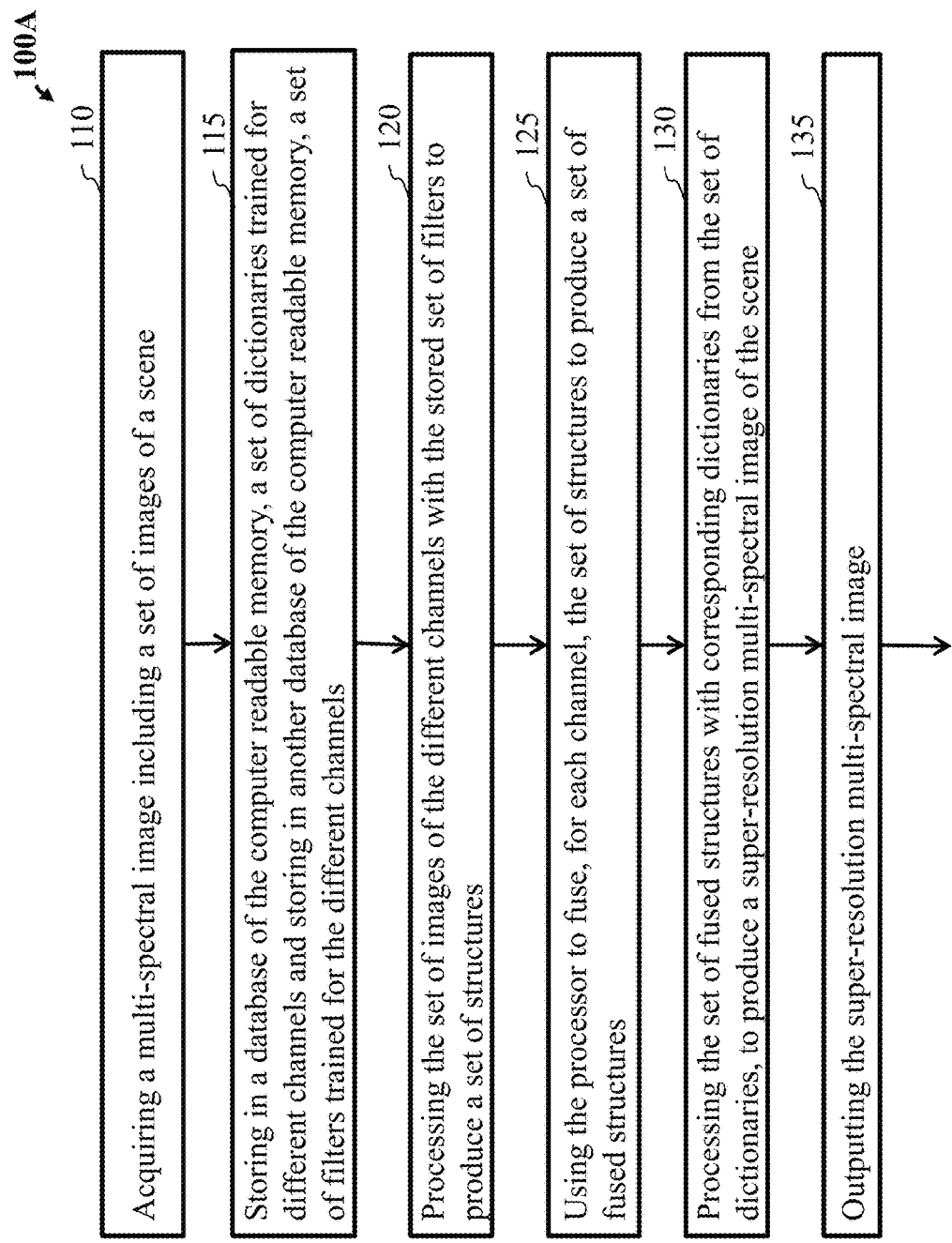
FIG. 1A is a block diagram illustrating a flow chart of a method for image processing for increasing resolution of a multi-spectral image, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

Embodiments of present disclosure are based increasing resolution of multi-spectral (MS) images using convolutional dictionaries. In particular, MS image super-resolution aims to reconstruct super-resolved (SR) multi-channel images from their low-resolution images by regularizing the image to be reconstructed. The present disclosure through experimentation, developed a novel coupling analysis and synthesis dictionary (CASD) model for MS image SR, by exploiting a regularizer that operates within, as well as across multiple spectral channels using convolutional dictionaries. For example, the CASD model includes parameters, where a deep dictionary learning framework, named DeepCASD, can be used by unfolding and training an end-to-end CASD based reconstruction network over an image dataset.

Some embodiments are based on recognition that the introduction of dictionary learning makes data-driven methods advantageous for image super resolution. Learned through experimentation is that MS images can be processed independently for each spectral channel. Further realized is that extending these convolutional dictionary learning methods to MS image SR applications can be by learning convolutional dictionaries independently from channel to channel, but from experimentation learned is that this extension would not exploit the relationship of multi-spectral images across the spectral channels.

Other aspects learned through experimentation includes MS imaging systems can measure the response from an area of interest over a wide range of frequency bands including visible optical RGB, infra-red, and short-wave infra-red bands. These multi-band spectra can provide rich information for detecting and distinguishing materials, especially for those materials with visually similar colors. Furthermore, the higher atmospheric transmission property of infra-red bands versus optical bands makes the MS imaging more beneficial in hazy or cloudy weather conditions when optical imaging systems do not work well.

In order to fully exploit the relationship of MS image within as well as across different image channels, some embodiments introduce a coupled analysis and synthesis dictionary (CASD) model for MS image SR. The CASD model allows to exploit the correlation between the low-resolution MS images and the high-resolution MS images to be reconstructed.

Specifically, some embodiments are based on recognition that a high-resolution image for each channel can be represented as a convolution of a dictionary learned for high-resolution images of a channel and a structure of a low-resolution image of the channel That structure can be extracted from each low-resolution image independently for each channel. However, this approach would not exploit the relationship of multi-spectral images across spectral channels. Wherein what was realized is that the structure of the low-resolution image of a scene can be acquired in a frequency band of the channel and learned from different low-resolution images of the scene acquired in different frequency bands of different channels including the frequency band of the channel Specifically, the structure of the low-resolution image can be a combination of filtered low-resolution images of different channels. Furthermore, the structure map can be sparse in the image domain under threshold θ, i.e., where most of the structure map coefficients are zeros. The coefficients of the filters $B_i$, dictionaries of the high-resolution images D, as well as the threshold θ can be learned off line for each channel Different coefficients of the filters correspond to different channels. Moreover, at least some coefficients of the filters representing different channels are non-zero to enable intra-channel dependency of MS images. In such a manner, the inter-image relationships are encoded in the dictionary, and intra-channel relationships are encoded in the filters.

To learn and apply the CASD model for MS image super-resolution, some embodiments use a neural network, such as a deep fusion network, and an end-to-end training method of the deep fusion network. Instead of iteratively updating model parameters, where each parameter is updated given the latest updates of other parameters, some embodiments unfold the CASD learning process for image fusion to construct a multi-layer neural network. The whole network is trained end-to-end using error back propagation, where each parameter is not just related to the latest updates of other parameters, but also related to the history updates of parameters.

For example, given a signal s and a dictionary matrix D, sparse coding is the inverse problem of finding the sparse representation x with only a few non-zero entries such that $Dx \approx s$. The process of arriving at these identifications requires a technique for learning the dictionary matrix D, referred herein as dictionary learning or a convolutional dictionary learning when the matrix D is learned for the entire image. Further, learning the dictionary matrix using the sparse representation may be beneficial for some applications. However, when the dictionary matrix D is learned for the high-resolution image that dictionary matrix can increase the resolution of the image using sparse representation x of the low-resolution image.

Some embodiments, in order to extent this concept to MS image super-resolution, learn the structure of an image of one channel from structures of different images of the multi-spectral image. For example, some embodiments fused the structures of different images for each channel using different weights to produce a set of fused structures. In such a manner, a fused structure of the channel is fused as a weighted combination of the set of structures using weights corresponding to the channel Notably, the fused structures of different channels are combined with different weights.

In some implementations, the set of dictionaries, the set of filters, and a set of weights for fusing structures of each channel are jointly trained using different images of different channels. For example, some embodiments introduce filters $B_i = \{W_{mi}\}$, capturing the structural relationship among MS images. In addition, some embodiments determine dictionary matrix D, coefficients of the filters $B_i = \{W_{mi}\}$, and threshold θ by minimizing the negative average peak signal-to-noise ratio over all training images and channels. In such a manner, the coefficients of the filter are trained to produce the sparse representation of MS image under trained threshold θ. The sparse representation, when convolved with the trained dictionary matrix, produces high-resolution MS image.

FIG. 1A is a block diagram illustrating a flow chart of a method for image processing for increasing resolution of a multi-spectral image, according to embodiments of the present disclosure. Method 100A includes step 110 of acquiring a multi-spectral image(s) having a set of images of a scene. Wherein each multi-spectral image represents a channel defining a frequency band, such that an image of a channel has its frequencies within a frequency band of the channel.

Step 115 of FIG. 1A can include storing in a database of the computer readable memory, a set of dictionaries trained for different channels, such that a dictionary trained for a channel convolved with a structure of the image, produces a high-resolution image of the channel having a resolution greater than a resolution of the image of the channel. Further, storing in another database of the computer readable memory, a set of filters trained for the different channels, such that a filter trained for a channel convolved with each image in the set of images, produces the structure of the image of the channel.

Step 120 of FIG. 1A can include processing the set of images of the different channels with the stored set of filters to produce a set of structures using a processor in communication with the computer readable memory and input interface.

Step 125 of FIG. 1A can include using the processor to fuse, for each channel, the set of structures to produce a set of fused structures, wherein a fused structure of the channel is fused as a weighted combination of the set of structures using weights corresponding to the channel, such that the fused structures of the different channels are combined with different weights.

Step 130 of FIG. 1A can include processing the set of fused structures with corresponding dictionaries from the set of dictionaries, to produce a super-resolution multi-spectral image of the scene.

Step 135 of FIG. 1A can include outputting the super-resolution multi-spectral image by an output interface to communication network, or storing the super-resolution multi-spectral image in the computer readable memory.

Figure 1B:
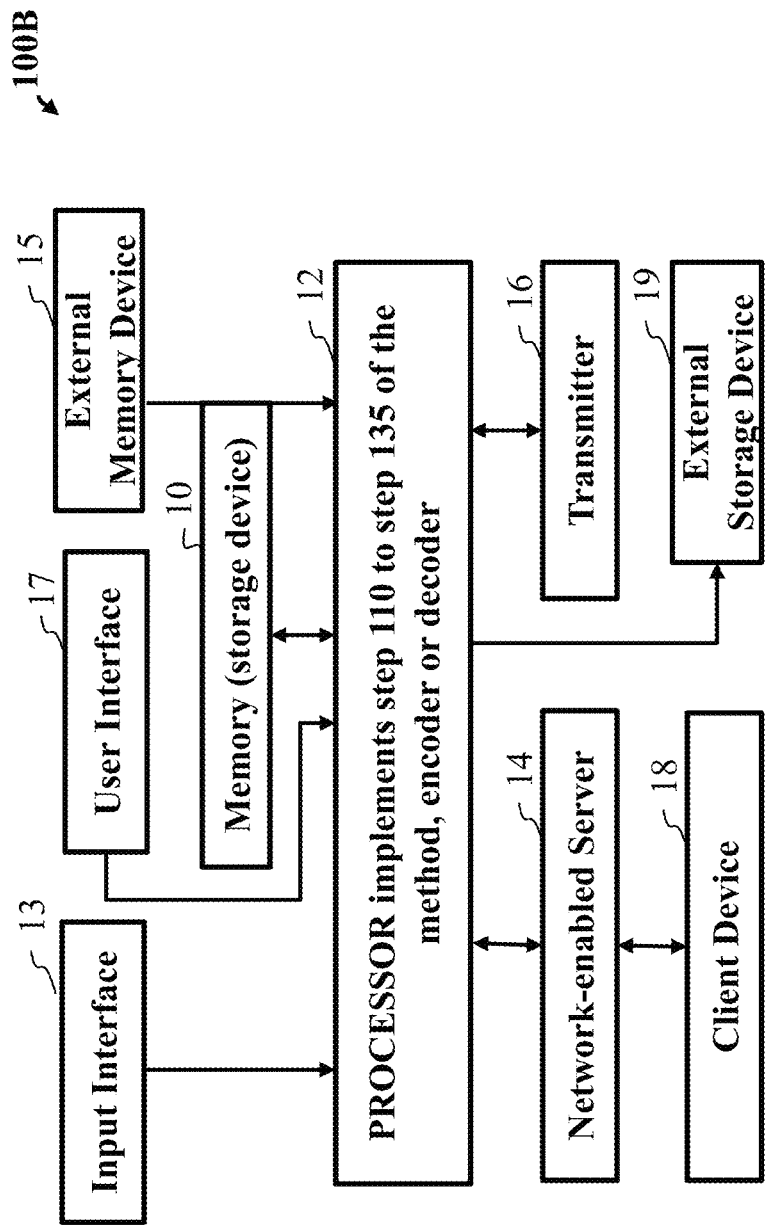
FIG. 1B is a schematic illustrating a method that includes some components that may be used for implementing the method, according to embodiments of the present disclosure.

FIG. 1B is a schematic illustrating a method that includes some components that may be used for implementing the method 100B, according to embodiments of the present disclosure. For example, some components can include an input interface 13, an external memory device 15, a memory 10, a processor 12 that can implement the steps of the method.

The signal data including multi-spectral image data 1 can be gathered by the sensor 3 and acquired by the input interface 13 or from an external memory device 15, or some other means of communication either wired or wireless. For example, the multi-spectral image(s) data 1 can be acquired by the processor 12 either directly or indirectly, e.g., a memory transfer device, or a wireless communication like device. It is possible, a user interface 17 having a keyboard (not shown) can be in communication with the processor 12 and a computer readable memory or memory, and can acquire and store the set of multi-angled view images in the computer readable memory 10 and other data, upon receiving an input from a surface of the keyboard of the user interface 17 by a user.

Still referring to FIG. 1B, the processor 12 can be in communication with a network-enabled server 14, that may be connected to a client device 18. Further, the processor 12 can be connected to a transmitter 16 and an external storage device 19.

Figure 1C:
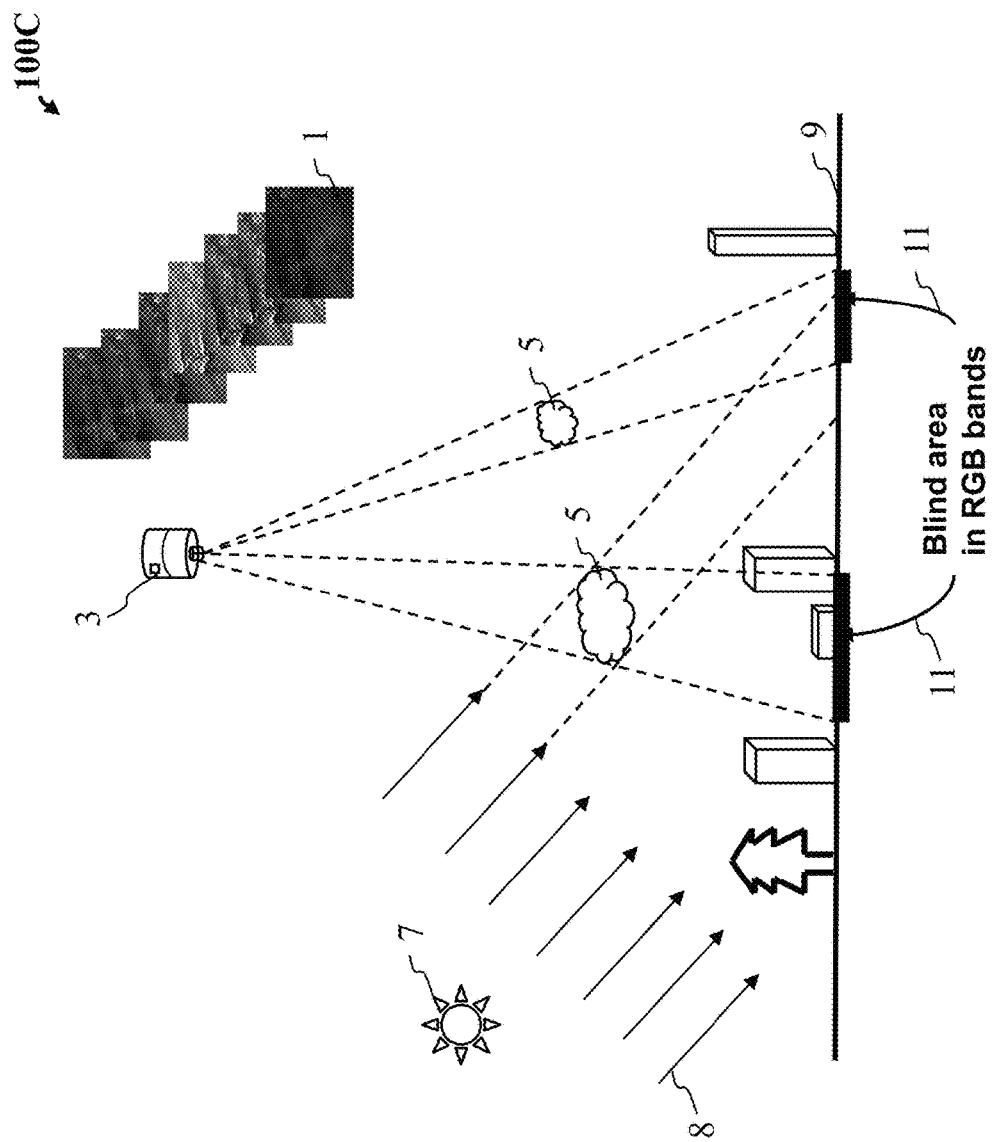
FIG. 1C is a schematic illustrating how the method can collect data for the method, according to embodiments of the present disclosure.

FIG. 1C is a schematic illustrating how a method can collect data, i.e. multi-spectral image of a scene, according to embodiments of the present disclosure. The method 100C can include a scene 9 with a sun 7 emitting sun rays 8 onto the scene, wherein clouds 5, obstruct a view from a sensor 3, i.e. video, camera, etc. The sensor 3 is cable of multiple sensing features including capturing or collecting data over a wide frequency range beyond the optical bands, including multi-spectral images 1 of the scene 9. Since infra-red and short-wave infra-red bands can penetrate clouds, the sensor 3 can capture the scene 9 in the infra-red and short-wave infrared bands. While in the optical RGB bands, blind areas 11 of the scene 9 are not visible from the sensor 3 because of clouds 5.

Figure 2A:
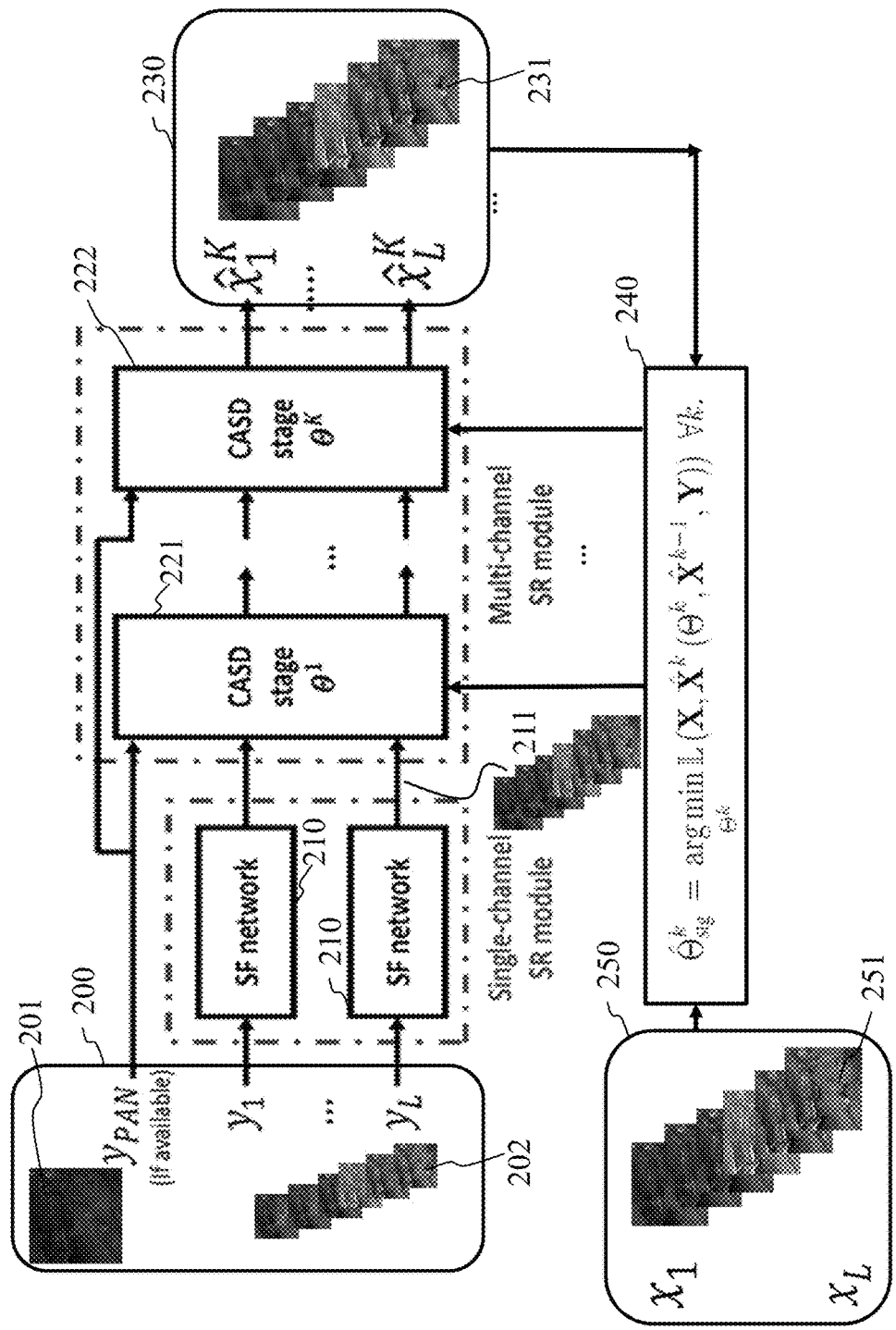
FIG. 2A is a schematic illustrating a training process that includes an outline of data-driven Coupled Analysis and Synthesis Dictionary (CASD) model using a deep-learning framework, named DeepCASD, for Multi-spectral (MS) images to reconstruct super-resolved (SR) multi-channel images, according to embodiments of the present disclosure.

FIG. 2A is a schematic illustrating an outline of data-driven Coupled Analysis and Synthesis Dictionary (CASD) model using a deep-learning framework, named DeepC-ASD, for Multi-spectral (MS) images to learn convolutional analysis dictionaries (filters) B, synthesis dictionaries D, and threshold parameters θ. First, each channel low-resolution image of the low resolution multi-spectral images 202 is input to a shrinkage field network 210 for super-resolution process independently. The output 211 of shrinkage field networks 210 and panchromatic image 201 are input of the CASD model to learn convolutionary dictionaries and parameters. With K-stage deep network 221 to 222, the output super-resolution images 230 including L multi-spectral images 231 are compared with the corresponding high-resolution images 250, including L multi-spectral images 251. The loss function between 231 and 251 is used to update convolutionary dictionaries B and D, and parameters θ. Once the loss function is below a preset value, the CASD model is well trained and ready for image super-resolution process.

Figure 2B:
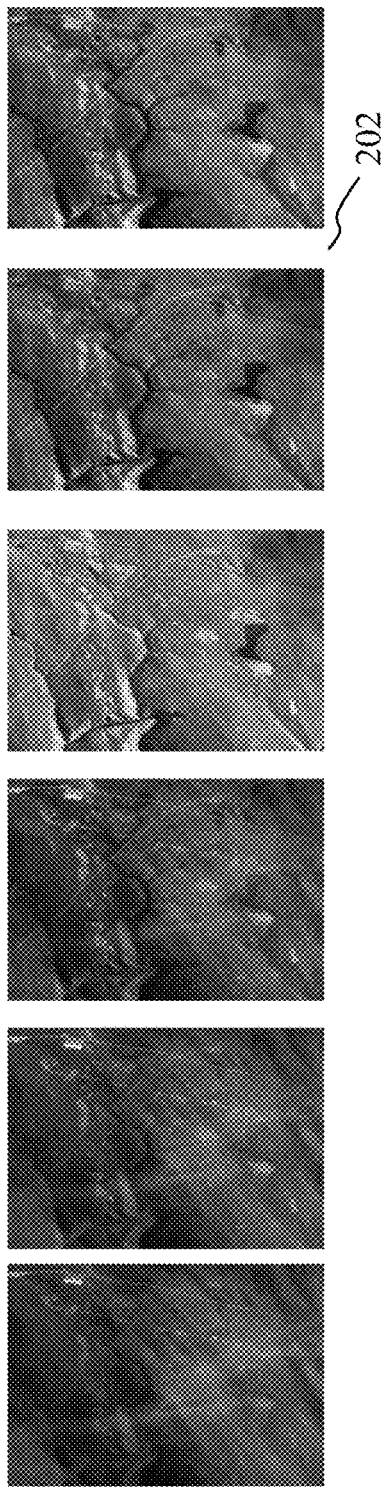
Figure 2C:
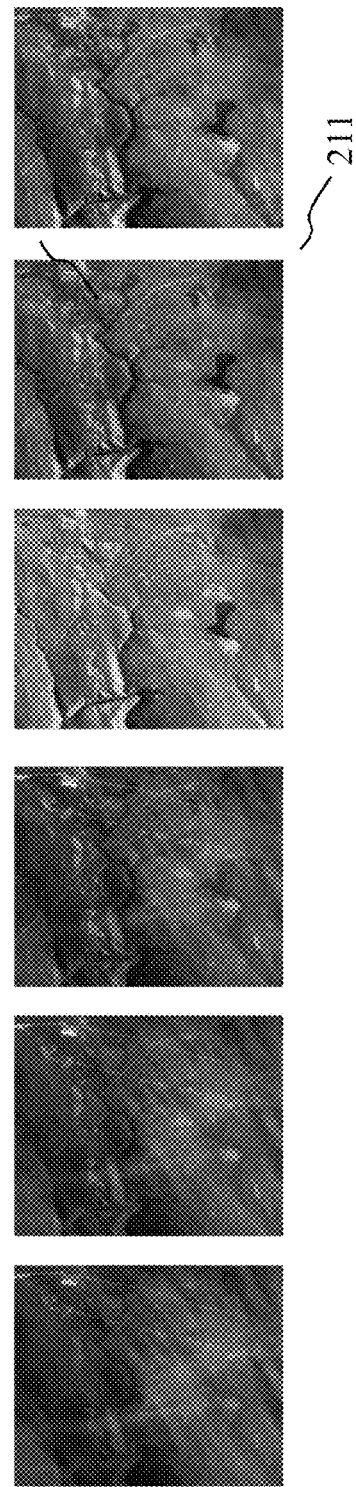
Figure 2D:
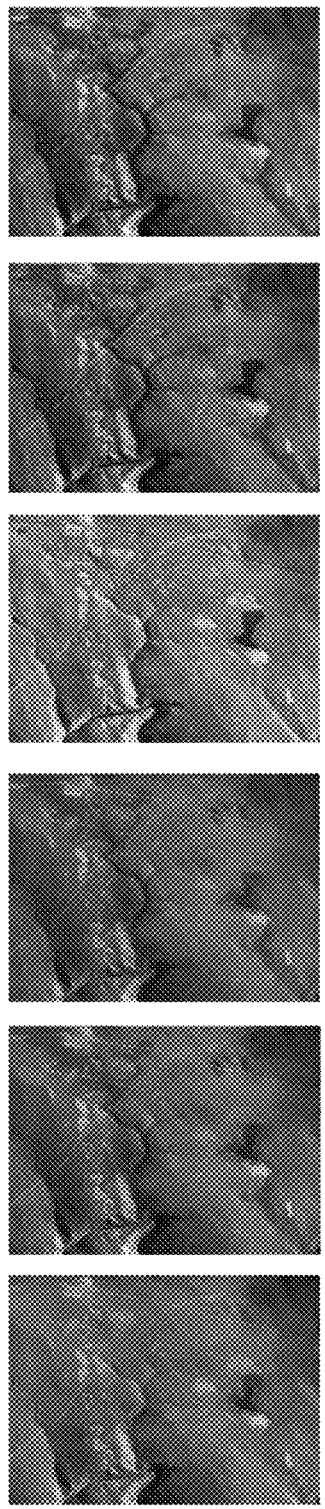
Figure 2E:
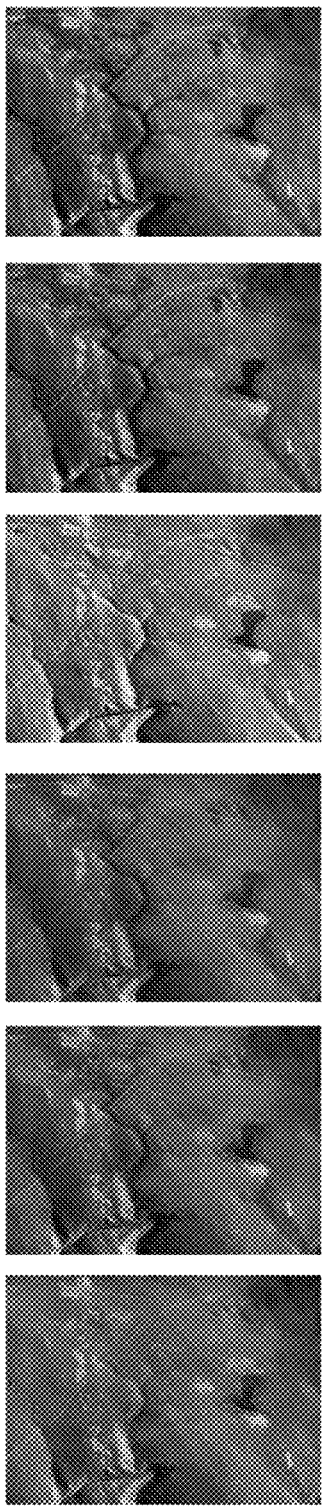

FIG. 2B, FIG. 2C, FIG. 2D and FIG. 2E are pictures illustrating example images from the training stage, wherein FIG. 2B illustrates low resolution images 202 that are inputted into shrinkage field network as initial super-resolution process, FIG. 2C illustrates multispectral images 211 as the output of the shrinkage field networks, with channel-independent process, also as the input of the CASD model. Without cross-channel structure fusion, some of images 211 not well resolved due to cloud coverage. FIG. 2D illustrates output images 231 from the CASD model, FIG. 2E illustrates stored corresponding high resolution images 251 that are compared to the output images of FIG. 2D during the training period, according to embodiments of the present disclosure.

Figure 3:
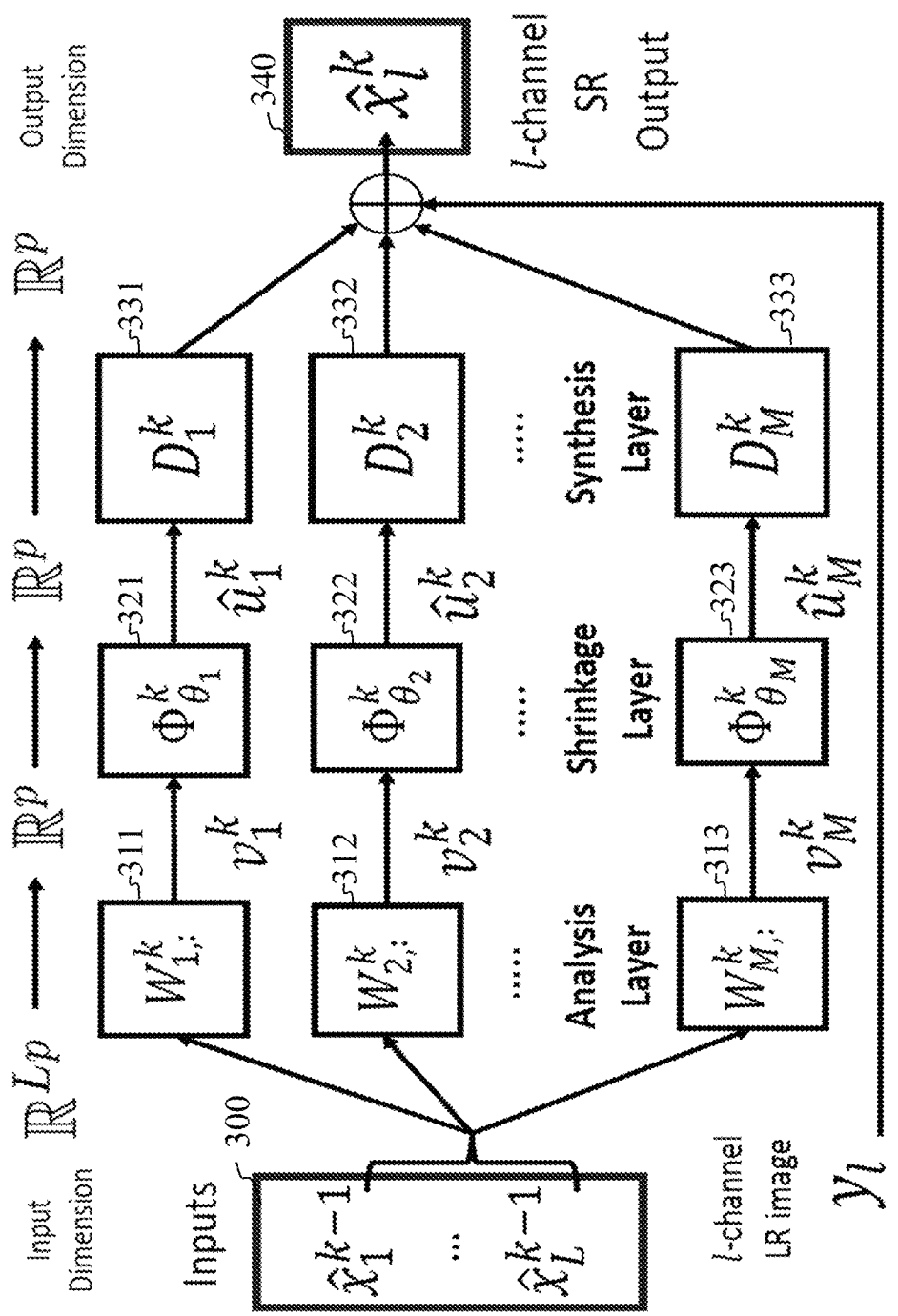
FIG. 3 is a schematic illustrating a layer-level structure of a k-th stage CASD for super-resolving a 1-th channel $\hat{x}_l^k$, and input/output data dimensions, according to embodiments of the present disclosure.

FIG. 3 is a schematic illustrating a layer-level structure of a k-th stage CASD 221 for super-resolving a l-th channel $\hat{x}_l^k$, and input/output data dimensions, according to embodiments of the present disclosure. Each channel of L multi-spectral images 300 is convolved with M analysis dictionaries 311 $w_{l,:}^k$, 312 $w_{2,:}^k$, ..., and 313 $w_{M,:}^k$, resulting M structure maps $v_1^k, v_2^k, \ldots, v_M^k$ for each channel image. After shrinkage process 321 $\Phi_{\theta_1}^k(\bullet)$, 322 $\Phi_{\theta_2}^k(\bullet)$, ..., and 323 $\Phi_{\theta_M}^k(\bullet)$, with thresholding parameters $\theta_1, \theta_2, \ldots, \theta_M$, sparse structure maps $\hat{u}_1^k, \hat{u}_2^k, \ldots \hat{u}_M^k$ are achieved, and used to convolved with the synthesis dictionaries 331 $D_1^k$, 332 $D_2^k, \ldots,$ and 333 $D_M^k$, incorporated with high-resolution panchromatic image 201, if available, to generated the 1-channel super-resolution image 340 $\hat{x}_l^k$.

Figure 4:
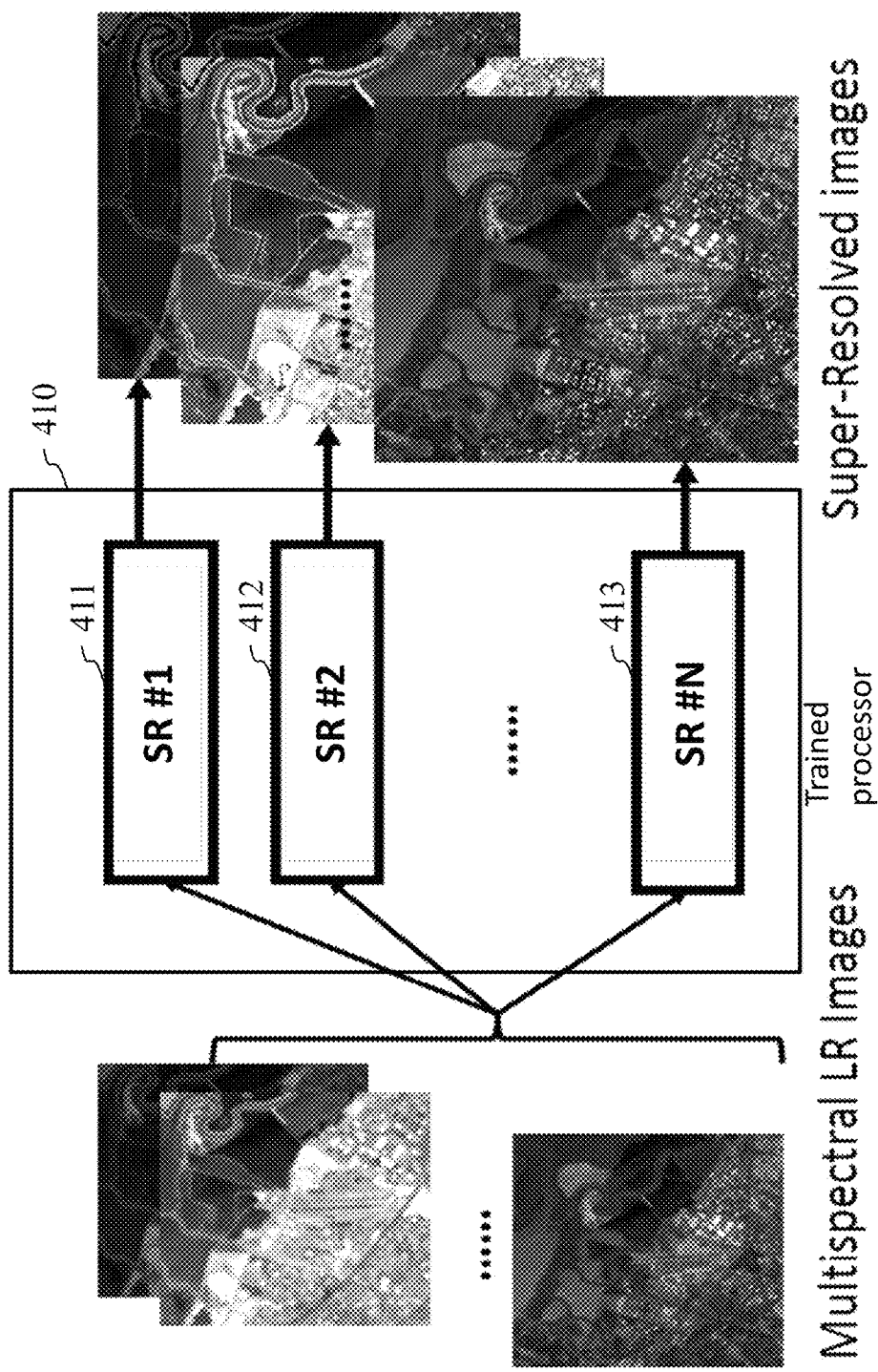
FIG. 4 is a schematic illustrating image fusion using the trained model that includes an outline of using a well-trained DeepCASD model for MS images to reconstruct SR multi-channel images, according to embodiments of the present disclosure.

FIG. 4 is a schematic illustrating an outline of a DeepC-ASD model for MS images to reconstruct SR multi-channel images, according to embodiments of the present disclosure.

Figure 5:
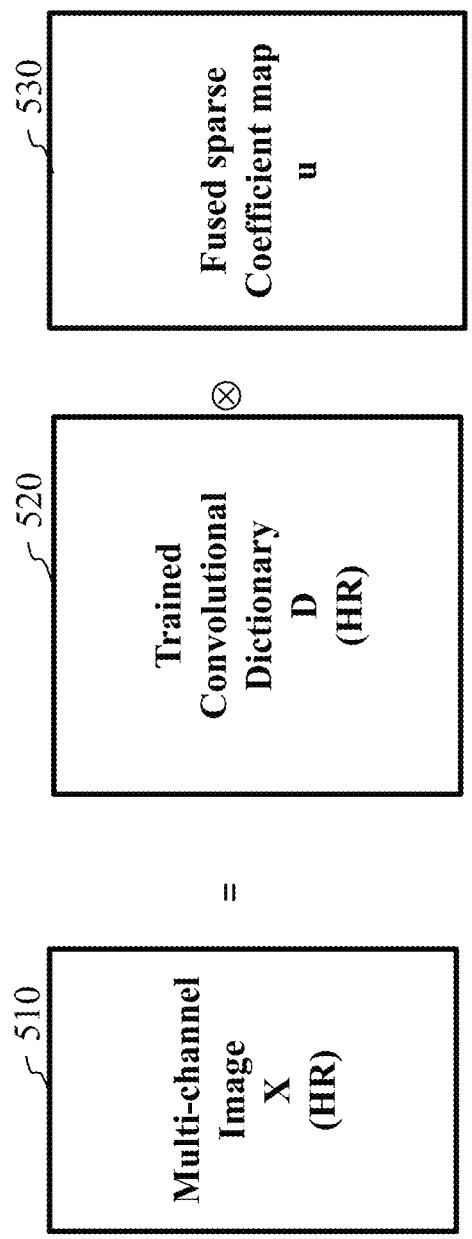
FIG. 5 is a block diagram illustrating some principles of high definition (HD) image synthesis, according to embodiments of the present disclosure.

FIG. 5 is a block diagram illustrating some principles of high definition (HD) image synthesis, according to embodiments of the present disclosure. For example, the fused sparse coefficient map u 530, times, the trained convolutional dictionary D (HR) 520, equals the multi-channel image X (HR) 510 of FIG. 5.

CASD Model

For MS image SR, an end-to-end fusion network is presented, named DeepCASD. The structure of each Deep-CASD block, as illustrated in FIG. 4, is composed of both single-channel and multi-channel SR modules, to fully operate within and across different image channels. A Shringe Field (SF) network is used as the single-channel module due to its demonstrated performance and efficiency. Given L spectral channels, the multi-channel CASD model assumes that each HR image $x_l$, for $l \in \{1, \ldots, L\}$, and all of the multi-channel LR measurements $y = [y_1^T | \ldots | y_L^T]^T \in \mathbb{R}^{Lp}$ are approximately sparse under convolutional synthesis and analysis dictionaries, respectively, with a shared coefficient map $u \in \mathbb{R}^{Mp}$.

The HR image $x_l$ in each channel is super-resolved, by solving the following CASD imaging problem $$\min_{x_l, u_l} \frac{1}{2}\|y_l - x_l\|_2^2 + \frac{\lambda_2}{2}\|B_l y - u_l\|_2^2 + \frac{\lambda_1}{2}\|x_l - D_l u_l\|_2^2 + \Phi_{\theta_l}(u_l) \quad (P2)$$

where $D_l = [D_{l,1} | \ldots | D_{l,M}] \in \mathbb{R}^{p \times Mp}$ is the convolutional synthesis dictionary for $x_l$, while the convolutional analysis dictionary $B_l$ for y in (P2) is defined as $$B_l = \begin{bmatrix} W_{1,1}^l & \cdots & W_{1,L}^l \\ \vdots & \ddots & \vdots \\ W_{M,1}^l & \cdots & W_{M,L}^l \end{bmatrix} \in \mathbb{R}^{Mp \times Lp}. \quad (1)$$

In (P2), the terms $\|B_l y - u_l\|_2^2$ and $\|x_l - D_l u_l\|_2^2$ denote the modeling errors for $x_l$ under the analysis dictionary, and the synthesis dictionary, respectively. Comparing to the single analysis model used in (P1), the CASD model in (P2) further exploits the correlation between the LR measurements and the HR image, rather than only the HR image structure.

To learn the CASD, one can directly solve (P2) using alternating minimization, which has been widely used in previous work on coupled dictionary learning. A review of deep learning can be by unfolding the synthesis sparse coding problem which demonstrated superior performance in many imaging applications during experimentation. Such that, instead of directly optimizing the loss function in (P2), the present disclosure uses an end-to-end learning framework, namely DeepCASD, by unfolding the CASD learning for image fusion. An outline of the DeepCASD for MS image SR is illustrated in FIG. 2A.

End-to-End DeepCASD Learning

The multi-channel SR module in the proposed DeepCASD contains K CASD stages. In each stage, the trainable parameter set is $B_l$, $\theta_l$, $D_l$, which is used to generate the feature map $u_l$, and thus super-resolve each $y_l$. Given $u_l$ and the dictionary $D_l$, the solution $\hat{x}_l$ to (P2) is given by $$\hat{x}_l = \lambda_1/(1+\lambda_1) D_l u_l + 1/(1+\lambda_1) y_l \quad (2)$$
$$= \tilde{D}_l u_l + \lambda' y_l$$

where $\lambda' = 1/(1+\lambda_1)$, and $\lambda_1/(1+\lambda_1)$ is absorbed into $\tilde{D}_l$ during the learning. To obtain the feature map $u_l$, directly solving (P2) involves gradient calculation using the trainable $D_l$ and the output $\hat{x}_l$ in the end-to-end training, which leads to the recurrent neural network structure. The present disclosure constructs the feed-forward DeepCASD network for efficient implementation, such that each $u_l$ is estimated by solving the following analysis (i.e. transform) model sparse coding problem $$\hat{u}_l = u_l \|u_l - B_l y\|_2^2 + \Phi_{\theta_l}(u_l) \quad (3)$$
$$= \eta_{\theta_l}(B_l y) \; \forall\, l = 1, \ldots, L$$

where $\eta_{\theta_l}(\cdot)$ denotes the corresponding shrinkage function of the feature regularizer $\Phi_{\theta_l}(\cdot)$. For example, when $\Phi_\theta(u) := \theta\|u\|_0$ with the $l_0$ "norm" that counts the number of non-zero elements of u, the corresponding $\eta_\theta(\cdot)$ becomes the hard-thresholding function of u, with threshold value $\theta$. Here we use the trainable Gaussian RBF to be the shrinkage function $\eta_{\theta_l}(\cdot)$, which shows good generalization of non-linear shrinkage functions in the SF network.

To analyze the cascaded structure in the proposed DeepCASD, we denote the l-channel super-resolved image as $\hat{x}_l^k$ at the k-th stage, $k = 1, \ldots, K$. The trainable set at the k-th stage for the $\hat{x}_l^k$ reconstruction is denoted as $B_l^k$, $\theta_l^k$, $D_l^k$. FIG. 4 illustrates how the K cascaded CASD stages construct the multi-channel SR module: the k-th stage multi-channel output $\hat{x}^k \in \mathbb{R}^{Lp}$ is passed to the next stage as its LR input. It can be expressed as a function of the dictionaries $D_l^k$ and $B_l^k$, the shrinkage function parameter set $\theta_l^k$, the previous stage output $\hat{x}^{k-1} = \{\hat{x}_l^{k-1}\}_{l=1}^L$, and l-th channel LR image $y_l$ recursively as follow $$\hat{x}_l^k = f(D_l^k, B_l^k, \theta_l^k, \hat{x}^{k-1}, y_l) \quad (4)$$
$$= D_l^k \eta_{\theta_l^k}(B_l^k \hat{x}^{k-1}) + \lambda' y_l \; \forall\, l, k$$

where $\hat{x}^0$ denotes the input at the first stage. FIG. 2 illustrates the layer-level structure of the k-th stage CASD network for $\hat{x}_l^k$ reconstruction. Note that $W_{m,:}^k$ denotes the m-th row of $B_l^k$, which fuses the multi-channel input $\hat{x}^{k-1}$ before applying the shrinkage, i.e., $v_m^k = w_{m,:}^k \hat{x}^{k-1} \in \mathbb{R}^p$.

The DeepCASD is trained over a training set which contains N pairs of multi-channel HR images $x = [x_{(1)} | \ldots | x_{(N)}]$ and their LR measurements $Y = [y_{(1)} | \ldots | y_{(N)}]$. The negative average reconstruction PSNR over all images and channels is employed as the cost function L at the final output:

$$L(X, \hat{X}^K) = -PSNR \quad (5)$$
$$= -\frac{20}{NL} \sum_{i=1}^{N} \sum_{l=1}^{L} \log_{10} \frac{B\sqrt{P}}{\|x_{(i),l} - \hat{x}_{(i),l}^K\|_2}.$$

Here B is the maximum image pixel value (e.g., B=255 for 8-bit image), and $\hat{X}^K$ denotes the super-resolved multi-channel images using DeepCASD. Let the set of all trainable parameters in the K-stage DeepCASD be $\Theta = \{\Theta^k\}_{k=1}^K = \{\{B_l^k, \theta_l^k, D_l^k\}_{l=1}^L\}_{k=1}^K$. The joint DeepCASD training problem is formulated as $$\hat{\Theta} = \arg\min_{\Theta} L(X, \hat{X}^K(\Theta, Y)) \quad (P3)$$

Problem (P3) can be solved using error back-propagation. Alternatively, as each DeepCASD stage itself is a stand-alone image fusion network, each $\Theta_k$ can be trained separately by solving the following stage-wise DeepCASD training problem $$\hat{\Theta}_{stg}^k = \arg\min_{\Theta^k} L(X, \hat{X}^k(\Theta^k, \hat{X}^{k-1}, Y)) \forall k. \quad (P4)$$

In practice, as (P3) is highly non-convex, it is more efficient to use the stage-wise $\{\Theta_{stg}^k\}_{k=1}^K$ learned using (P4) as the initialization in the joint training for (P3). Once the DeepCASD network training is completed, the multi-channel SR is conducted by applying (4) recursively with the trained $\hat{\Theta}$.

FIG. 3 illustrates the layer-level structure of the k-th stage CASD for super-resolving the l-th channel $\hat{x}_l^k$, and the input/output data dimensions.

Table 1: PSNR values (in dB) for MS image×2 SR, averaged over 16 channels, using bicubic interpolation, dictionary learning (DL), Shrinkage Field (SF), and the proposed DeepCASD method. The best PSNR value in each row is marked in bold.

TABLE 1

PSNR values (in dB) for MS image ×2 SR, averaged over 16 channels, using bicubic interpolation, dictionary learning (DL), Shrinkage Field (SF), and the proposed DeepCASD method. The best PSNR value in each row is marked in bold.

| MS Images | Bicubic | DL | SF | DeepCASD |
|---|---|---|---|---|
| Moffett | 32.27 | 33.81 | 34.25 | 34.57 |
| Cambria Fire | 35.49 | 36.55 | 37.09 | 37.22 |
| Cuprite | 32.36 | 33.60 | 34.49 | 34.68 |
| Los Angeles | 27.97 | 29.62 | 30.34 | 30.46 |
| Average | 32.02 | 33.41 | 34.04 | 34.23 |

Numerical Experiments

TABLE 1

The zoom-in of example regions, and their ×2 SR results of RGB and Infra-red channels of MS images, using different SR methods.

| Cuprite (RGB) | bicubic (32.53 dB) | DL (34.81 dB) | SF (34.96 dB) | DeepCASD (35.27 dB) |
|---|---|---|---|---|
| Cuprite (Infra-red) | bicubic (30.25 dB) | DL (32.08 dB) | SF (32.19 dB) | DeepCASD (32.29 dB) |
| Moffett (RGB) | bicubic (27.86 dB) | DL (29.71 dB) | SF (29.80 dB) | DeepCASD (30.09 dB) |
| Moffett (Infra-red) | bicubic (36.51 dB) | DL (38.44 dB) | SF (38.58 dB) | DeepCASD (38.93 dB) |

Table 1: The zoom-in of example regions, and their ×2 SR results of RGB and Infra-red channels of MS images, using different SR methods.

Experiments

To evaluate and compare the performance of the proposed DeepCASD on the SR problem over remote sensing MS images. The MS images of 17 discrete channels, including panchromatic, RGB, infra-red, and short-wave infra-red channels, are synthesized, using AVIRIS hyper-spectral image data sets. Each high-resolution MS channel is generated as a weighted sum of multiple hyper-spectral channels covering adjacent frequency bands. The corresponding low-resolution MS channels are then generated by down-sampling the high-resolution MS image through a low-pass filter. The parameters of the deep CASD network are first trained using a set of MS images. The training set contains 138 pairs of high-resolution MS images and their corresponding low-resolution measurements, across 16 channels. Each HR image in a single channel is of size 256×256. The LR images are first up-scaled to the HR image size by bicubic interpolation. As the HR panchromatic image is typically available in remote sensing applications, we pass it through a skip link directly to each multi-channel SR stage (i.e., there are L=16 input multi-spectral channels and one panchromatic input and L=16 output multi-spectral channels in each CASD stage) in training and testing (see FIG. 2A).

Three single-channel SR stages in the single-channel SR module (FIG. 2A) are used, followed by one multi-channel SR stage in the DeepCASD network, and perform a for 2×-SR experiment. Noticed is an improved SR performance using DeepCASD with more SR stages. However, more training data are required for training deeper networks, otherwise DeepCASD may suffer from overfitting which causes degraded SR quality. For the training process, further noticed is that joint training may achieve slightly better performance in SR compared to stage-wise training, but is more time-consuming. Stage-wise training is used for its efficiency and resilience to degradation in SR performance, compared to joint training. Once the training is complete, the MS images of other regions in the AVIRIS dataset are super-resolved, which contain diverse geometric properties. The reconstructed image PSNR is used as the quality metric.

Figure 6:
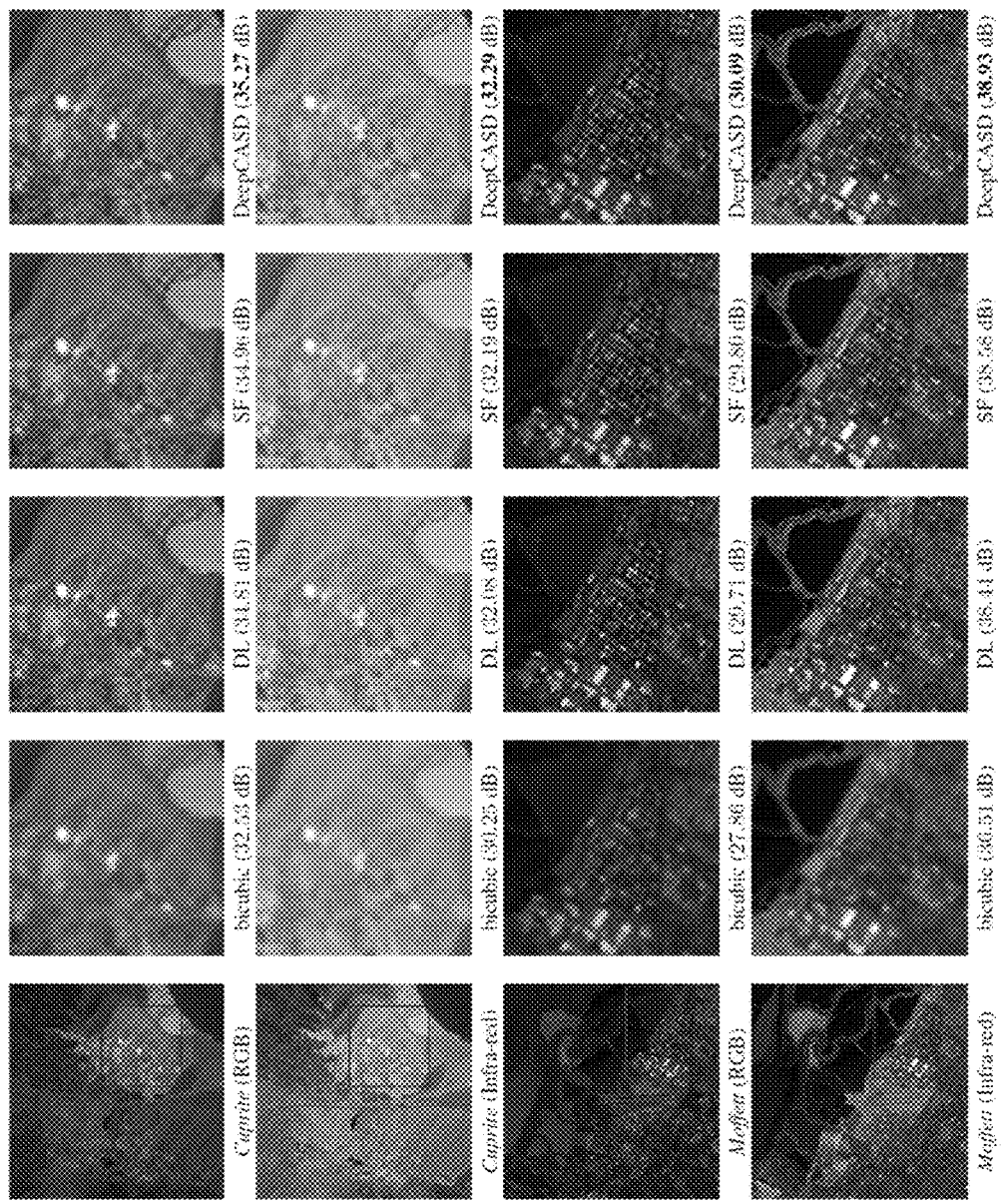
FIG. 6 shows some example SR results of the true color (RGB) and false color of three infra-red channels of MS images, according to embodiments of the present disclosure.

FIG. 6 shows some example SR results of the true color (RGB) and false color of three infra-red channels of MS images, according to embodiments of the present disclosure. For example, comparing to results obtained by conventional Dictionary Learning (DL) and Shringe Field (SF) methods, DeepCASD is capable of discovering more details, especially by better resolving the important local regions such as roads and buildings.

To analyze the performance of MS image SR results quantitatively, and using the reconstructed MS image PSNRs in Table 1 for four different testing areas in California. Each PSNR value is averaged over 16 MS channels, obtained using the aforementioned methods. It is clear that the proposed DeepCASD scheme outperforms all competing methods for all testing MS images. The average PSNR improvement of DeepCASD results over bicubic interpolation, dictionary learning (DL) based SR, and the SF network are 2.2 dB, 0.8 dB, and 0.2 dB, respectively.

The present disclosure data-driven method uses deep coupled analysis and synthesis dictionary (DeepCASD) framework for multi-spectral image super-resolution. Wherein the disclosed methods allow couplings of convolutional dictionaries within and across multiple image channels while leveraging high-dimensional data in an effective way within an end-to-end training process.

Figure 7:
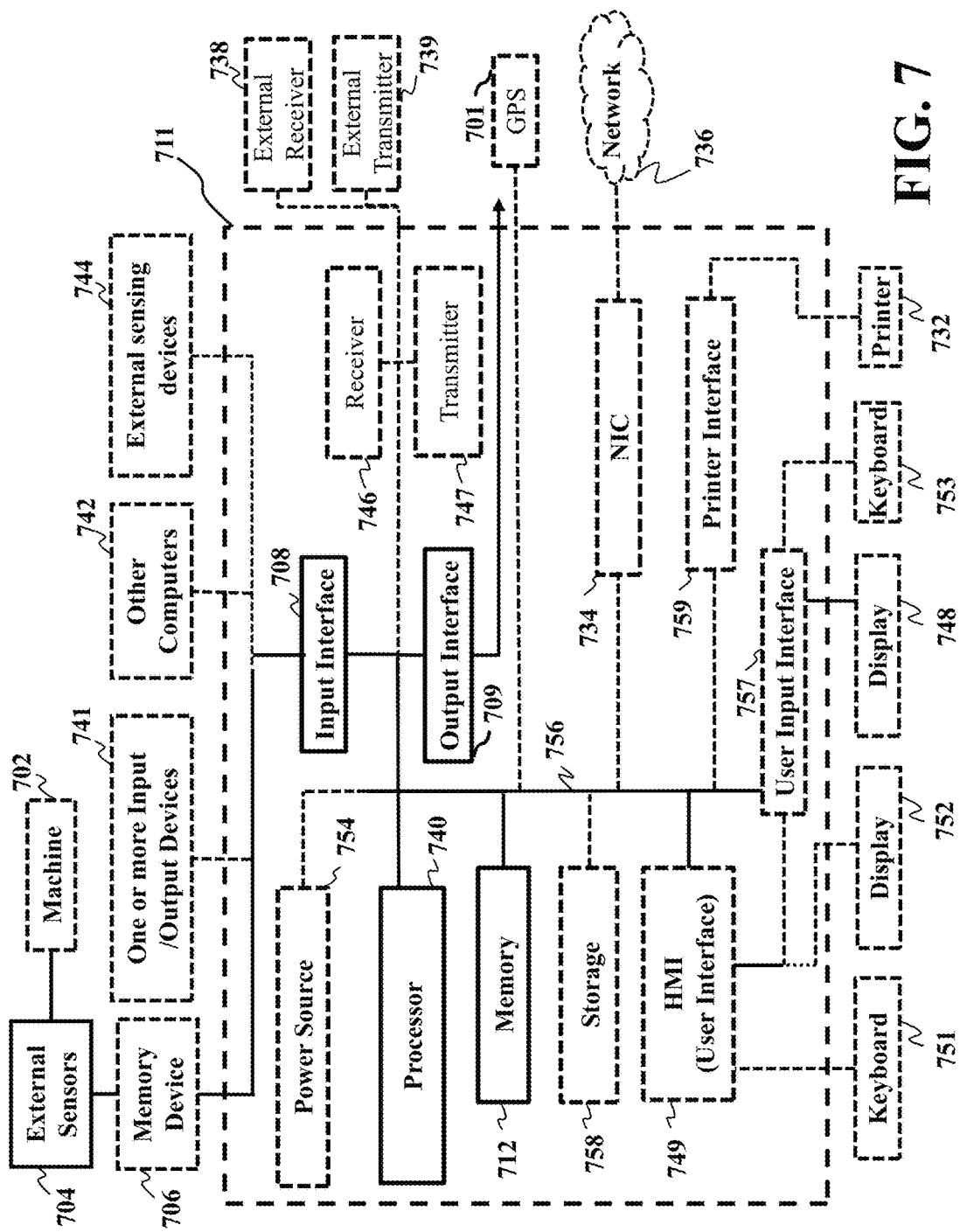
FIG. 7 is a block diagram of illustrating the method of FIG. 1A, that can be implemented using an alternate computer or processor, according to embodiments of the present disclosure.

FIG. 7 is a block diagram of illustrating the method of FIG. 1A, that can be implemented using an alternate computer or processor, according to embodiments of the present disclosure. The computer 711 includes a processor 740, computer readable memory 712, storage 758 and user interface 749 with display 752 and keyboard 751, which are connected through bus 756. For example, the user interface 764 in communication with the processor 740 and the computer readable memory 712, acquires and stores the image data in the computer readable memory 712 upon receiving an input from a surface, keyboard 753, of the user interface 757 by a user.

The computer 711 can include a power source 754, depending upon the application the power source 754 may be optionally located outside of the computer 711. Linked through bus 756 can be a user input interface 757 adapted to connect to a display device 648, wherein the display device 748 can include a computer monitor, camera, television, projector, or mobile device, among others. A printer interface 759 can also be connected through bus 756 and adapted to connect to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect through the bus 756 to a network 736, wherein image data or other data, among other things, can be rendered on a third party display device, third party imaging device, and/or third party printing device outside of the computer 711. The computer/processor 711 can include a GPS 701 connected to bus 756. Further, Still referring to FIG. 7, the image data or other data, among other things, can be transmitted over a communication channel of the network 736, and/or stored within the storage system 758 for storage and/or further processing.

Further, the time series data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The computer 711 may be connected via an input interface 708 to external sensing devices 744 and external input/output devices 741. The input interface 708 can be connected to one or more input/output devices 741, external memory 706, external sensors 704 which may be connected to a machine like device 702. For example, the external sensing devices 744 may include sensors gathering data before-during-after of the collected time-series data of the machine. The computer 711 may be connected to other external computers 742. An output interface 709 may be used to output the processed data from the processor 740. It is noted that a user interface 749 in communication with the processor 740 and the non-transitory computer readable storage medium 712, acquires and stores the region data in the non-transitory computer readable storage medium 712 upon receiving an input from a surface 752 of the user interface 749 by a user.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An imaging system for increasing resolution of a multi-spectral image, comprising:
    an input interface to accept a multi-spectral image including a set of images of a scene generated by sensors, each image represents a channel defining a frequency band, such that an image of a channel has its frequencies within a frequency band of the channel;
    a memory to store
    a set of synthesis dictionaries trained for different channels, such that a synthesis dictionary trained for a channel convolved with a structure of the image, produces a high-resolution image of the channel having a resolution greater than a resolution of the image of the channel; and
    a set of filters (analysis dictionaries) trained for the different channels, such that a filter (analysis dictionary) trained for a channel convolved with each image in the set of images produces the structure of the image of the channel;

a hardware processor is to
- process the set of images of the different channels with the set of filters (analysis dictionaries) to produce a set of structures;
- fuse, for each channel, the set of structures, to produce a set of fused structures, wherein a fused structure of the channel is fused as a weighted combination of the set of structures using weights corresponding to the channel, such that the fused structures of different channels are combined with different weights;
- process the set of fused structures with corresponding dictionaries from the set of dictionaries, to produce a super-resolution multi-spectral image; and
- an output interface to render the super-resolution multi-spectral image.

2. The imaging system of claim 1, wherein each filter (analysis dictionary) in the set of filters and each dictionary in the set of dictionaries are trained using different images of the different channels.

3. The imaging system of claim 2, wherein the set of synthesis dictionaries and the set of filters (analysis dictionaries) are jointly trained to increase an average peak signal-to-noise ratio over all training images in the different channels.

4. The imaging system of claim 3, wherein the set of dictionaries and the set of filters are jointly trained by updating current values of the set of dictionaries and the set of filters in a current iteration, using previous values of the set of dictionaries and the set of filters learned during previous iterations.

5. The imaging system of claim 1, wherein the memory stores a set of thresholds trained for the channels, such that the hardware processor imposes sparsity on the structure of the image in the channel, by thresholding values of the structure of the image of the channel with a corresponding threshold.

6. The imaging system of claim 1, wherein the set of dictionaries are convolutional dictionaries.

7. The imaging system of claim 1, wherein the set of dictionaries, the set of filters (analysis dictionaries), and a set of weights for fusing structures of each channel are jointly trained using different images of the different channels.

8. The imaging system of claim 1, wherein the set of weights are incorporated into one or combination of the set of filters (analysis dictionaries) and the set of synthesis dictionaries, such that a combination of the convolutions of the set of synthesis dictionaries with the corresponding structures includes the fusion of the structures of the different images with corresponding weights.

9. The imaging system of claim 1, wherein the weights corresponding to the channel are determined by maximizing the average peak signal-to-noise ratio over all training images and channels.

10. A method for image processing for increasing resolution of a multi-spectral image, comprising:
- acquiring a multi-spectral image including a set of images of a scene generated by sensors and either acquired by an input interface or from a computer readable memory, each image represents a channel defining a frequency band, such that an image of a channel has its frequencies within a frequency band of the channel;
- storing in a database of the computer readable memory, a set of dictionaries trained for different channels, such that a dictionary trained for a channel convolved with a structure of the image, produces a high-resolution image of the channel having a resolution greater than a resolution of the image of the channel;
- storing in another database of the computer readable memory, a set of filters trained for the different channels, such that a filter trained for a channel convolved with each image in the set of images, produces the structure of the image of the channel;
- processing the set of images of the different channels with the stored set of filters to produce a set of structures using a hardware processor in communication with the computer readable memory and the input interface;
- using the hardware processor to fuse, for each channel, the set of structures to produce a set of fused structures, wherein a fused structure of the channel is fused as a weighted combination of the set of structures using weights corresponding to the channel, such that the fused structures of the different channels are combined with different weights,
- processing the set of fused structures with corresponding dictionaries from the set of dictionaries, to produce a super-resolution multi-spectral image of the scene; and
- outputting the super-resolution multi-spectral image by an output interface to a communication network, or storing the super-resolution multi-spectral image in the computer readable memory.

11. The method according to claim 10, wherein each filter in the set of filters and each dictionary in the set of dictionaries are trained using different images of the different channels.

12. The method of claim 11, wherein the set of dictionaries and the set of filters are jointly trained to increase an average peak signal-to-noise ratio over all training images in the different channels.

13. The method of claim 12, wherein the set of synthesis dictionaries and the set of filters (analysis dictionaries) are jointly trained by updating current values of the dictionaries and the set of filters in a current iteration using previous values of the dictionaries and the set of filters learned during previous iterations.

14. The method of claim 12, wherein the computer readable memory stores a set of thresholds trained for the channels, such that the hardware processor imposes sparsity on the structure of the image in the channel, by thresholding values of the structure of the image of the channel with a corresponding threshold.

15. The method of claim 10, wherein the set of dictionaries are convolutional dictionaries.

16. The method of claim 10, wherein the set of dictionaries, the set of filters, and a set of weights for fusing structures of each channel are jointly trained using different images of different channels.

17. The method of claim 10, wherein the set of weights are incorporated into one or combination of the set of filters and the set of dictionaries, such that a combination of the convolutions of the set of dictionaries with the corresponding structures includes the fusion of the structures of different images with corresponding weights.

18. A non-transitory computer readable storage medium embodied thereon a program executable by a computer for performing a method, the method is for image processing of images of a scene, comprising:
- acquiring a multi-spectral image including a set of images of a scene generated by sensors and either acquired by an input interface or from the storage medium, each image represents a channel defining a frequency band, such that an image of a channel has its frequencies within a frequency band of the channel;
- storing in a database of the storage medium, a set of dictionaries trained for different channels, such that a dictionary trained for a channel convolved with a structure of the image, produces a high-resolution image of the channel having a resolution greater than a resolution of the image of the channel;

storing in another database of the storage medium, a set of filters trained for the different channels, such that a filter trained for a channel convolved with each image in the set of images, produces the structure of the image of the channel;

processing the set of images of the different channels with the stored set of filters to produce a set of structures using the computer in communication with the storage medium and the input interface;

using the computer to fuse, for each channel, the set of structures to produce a set of fused structures, wherein a fused structure of the channel is fused as a weighted combination of the set of structures using weights corresponding to the channel, such that the fused structures of the different channels are combined with different weights;

processing the set of fused structures with corresponding dictionaries from the set of dictionaries, to produce a super-resolution multi-spectral image of the scene; and outputting the super-resolution multi-spectral image by an output interface to a communication network, or storing the super-resolution multi-spectral image in the storage medium.

\* \* \* \* \*